United States Patent
Suzuki

(10) Patent No.: US 6,641,152 B1
(45) Date of Patent: Nov. 4, 2003

(54) SWING SUPPRESSING DEVICE FOR INDUSTRIAL VEHICLE

(75) Inventor: Yasutaka Suzuki, Aichi-ken (JP)

(73) Assignee: Kabushiki Kaisha Toyoda Jidoshokki Seisakusho, Kariya (JP)

(*) Notice: Subject to any disclaimer, the term of this patent is extended or adjusted under 35 U.S.C. 154(b) by 0 days.

(21) Appl. No.: 09/629,605

(22) Filed: Jul. 31, 2000

(30) Foreign Application Priority Data

Aug. 5, 1999 (JP) .......................................... 11-222783

(51) Int. Cl.[7] .............................. B60G 7/00; B60P 7/00; B62D 7/00
(52) U.S. Cl. ........................... 280/124.112; 280/124.106
(58) Field of Search .................. 280/124.112, 124.106, 280/124.111, 124.107

(56) References Cited

U.S. PATENT DOCUMENTS

| | | | | |
|---|---|---|---|---|
| 2,624,415 A | * | 1/1953 | Moore | 280/124.112 |
| 2,792,235 A | * | 5/1957 | Federspiel | 280/124.106 |
| 2,872,210 A | * | 2/1959 | Shaffer | 280/124.107 |
| 3,077,952 A | * | 2/1963 | Neises | 280/124.112 |
| 3,086,786 A | * | 4/1963 | Tuczek | 280/124.106 |
| 3,089,710 A | * | 5/1963 | Fiala | 280/124.112 |
| 3,309,097 A | * | 3/1967 | Seeber | 280/124.112 |
| 3,368,705 A | * | 2/1968 | Orwig et al. | 280/124.112 |
| 3,602,524 A | * | 8/1971 | Rutzenhofer | 280/124.107 |
| 4,175,763 A | * | 11/1979 | Conner, Jr. | 280/124.111 |
| 4,393,959 A | * | 7/1983 | Acker | 280/124.112 |
| 4,881,752 A | * | 11/1989 | Tanaka | 280/124.128 |
| 5,108,126 A | * | 4/1992 | Banse | 280/124.136 |
| 5,941,546 A | * | 8/1999 | Pellerin | 280/124.112 |
| 5,997,013 A | * | 12/1999 | Claxton | 280/124.112 |
| 6,082,748 A | * | 7/2000 | Hartmann et al. | 267/248 |
| 6,357,543 B1 | * | 3/2002 | Karpik | 180/182 |
| 6,398,242 B1 | * | 6/2002 | Niwa et al. | 280/124.111 |

FOREIGN PATENT DOCUMENTS

| | | | | |
|---|---|---|---|---|
| DE | 3942654 A1 | * | 6/1991 | B60G/21/073 |
| JP | 5251620 A | * | 4/1977 | B60G/17/04 |
| JP | 5670609 A | * | 6/1981 | B60G/17/00 |
| JP | 64-1612 A | * | 1/1989 | B60G/15/06 |
| JP | 64-41408 A | * | 2/1989 | B60G/3/18 |
| JP | 64-41409 A | * | 2/1989 | B60G/13/08 |
| JP | 6441410 A | * | 2/1989 | B60G/15/06 |
| JP | 64-41411 A | * | 2/1989 | B60G/15/06 |
| JP | 3231010 A | * | 10/1991 | B60G/3/20 |
| JP | 585140 A | * | 4/1993 | B60G/21/05 |
| JP | 6199122 A | * | 7/1994 | B60G/15/06 |
| JP | 10-287116 | | 10/1998 | |

* cited by examiner

Primary Examiner—Paul N. Dickson
Assistant Examiner—Joselynn Y Sliteris
(74) Attorney, Agent, or Firm—Morgan & Finnegan, LLP

(57) ABSTRACT

A swing suppressing device includes a damper that may switch over between an expansion/retraction enable condition and an expansion/retraction disable condition; and a link mechanism for coupling the damper and the axle with each other. The damper is disposed with its expansion/retraction direction substantially in a horizontal direction between the vehicle body and the axle, and with its one end being connected to the vehicle body and the other end being connected to the axle through the link mechanism. The link mechanism converts the swing motion in the up-and-down direction of the axle and transmits it to the damper.

4 Claims, 2 Drawing Sheets

SWING SUPPRESSING DEVICE FOR INDUSTRIAL VEHICLE

BACKGROUND OF THE INVENTION

The present invention relates to a swing suppressing device mounted on an industrial vehicle.

DESCRIPTION OF THE RELATED ART

For example, in an industrial vehicle such as a forklift, in order to enhance vehicle stability upon traveling, an axle for supporting rear wheels is mounted swingably to a vehicle body. However, when the vehicle turns, in the case where the angular motion of the above-described axle is kept free, in some cases, the vehicle is so tilted that the traveling stability in turn would be degraded.

Accordingly, there is proposed a swing controlling device for controlling a swing motion of the axle within a suitable range as shown in Japanese Patent Application Laid-open No. 10-287116 or the like.

This swing controlling device is provided with a swing suppressing mechanism for suppressing (locking) the swing of the axle that may move up and down. This mechanism is controlled by a lateral acceleration (lateral G) and an idle rotation of the front wheels. In the above-described swing suppressing mechanism (swing suppressing device), a damper is generally interposed between the axle and the chassis so that the expansion and retraction of the damper may be locked or released.

If this swing controlling device is used, in the case where the lateral G is equal to or more than a predetermined level, the swing of the axle is locked to thereby suppress the tilt of the chassis and even in this case, if the front wheels are rotated in an idle manner, the swing lock of the axle is released to make it possible to escape from the idle rotation condition of the front wheels. For this reason, it is possible to perform the swing control of the axle at an optimum timing to thereby considerably enhance the traveling stability.

By the way, there are a variety of industrial vehicles having the axle that may swing and also a variety of different forms therefor. For example, in some cases, an upper space above the rear axle, i.e., a space between an upper portion of the axle and a battery or a frame of the chassis is small. In this case, it is impossible to directly interposed the above-described damper which forms the swing suppressing mechanism (swing suppressing device), between the chassis and the axle. For this reason, for the industrial vehicles having the small space above the rear axle, it is difficult to arrange the above-described swing suppressing device.

SUMMARY OF THE INVENTION

In view of the foregoing defects inherent in the conventional cases, an object of the present invention is to provide a swing suppressing device that may readily be arranged even in the case where the space above the swingable axle is small.

In order to attain this and other objects, according to the present invention there is provided a swing suppressing device for suppressing a swing motion of an axle that is mounted swingably up and down on a vehicle body of an industrial vehicle, said swing suppressing device comprising: a damper that may switch over between an expansion/retraction enable condition and an expansion/retraction disable condition; and a link mechanism for coupling said damper and said axle with each other, said damper being disposed with its expansion/retraction direction being set toward a substantially horizontal direction between said vehicle body and said axle, and with its one end being connected to said vehicle body and the other end being connected to said axle through said link mechanism, and said link mechanism converting the swing motion in the up-and-down direction of said axle to the motion in the substantially horizontal direction and transmitting it to said damper.

DESCRIPTION OF THE PREFERRED EMBODIMENTS

Embodiment 1

A swing suppressing device for an industrial vehicle in accordance with an embodiment of the present invention will now be described with reference to FIGS. 1 to 3.

Figure 1:
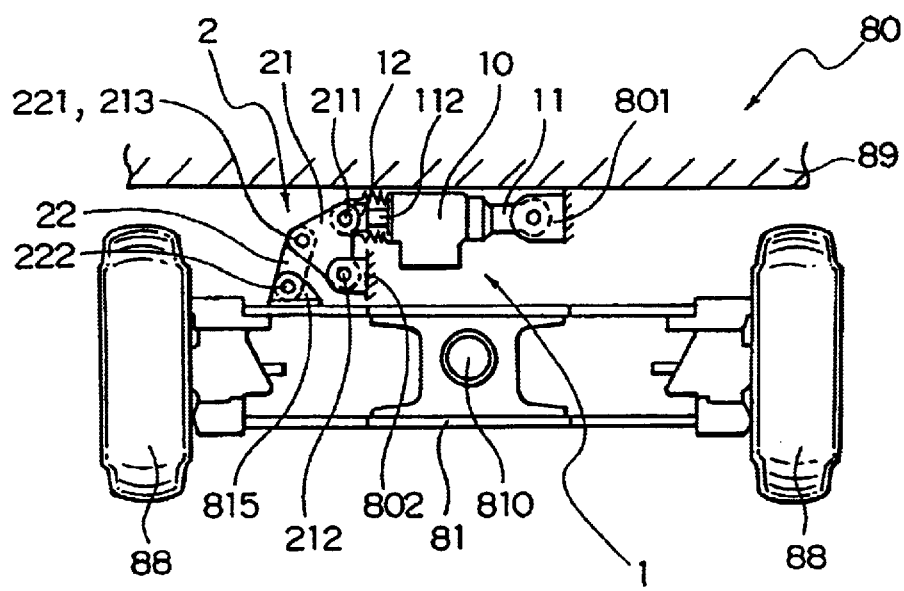
FIG. 1 is a view showing the structure of a swing suppressing device in accordance with a first embodiment of the present invention.
Figure 2:
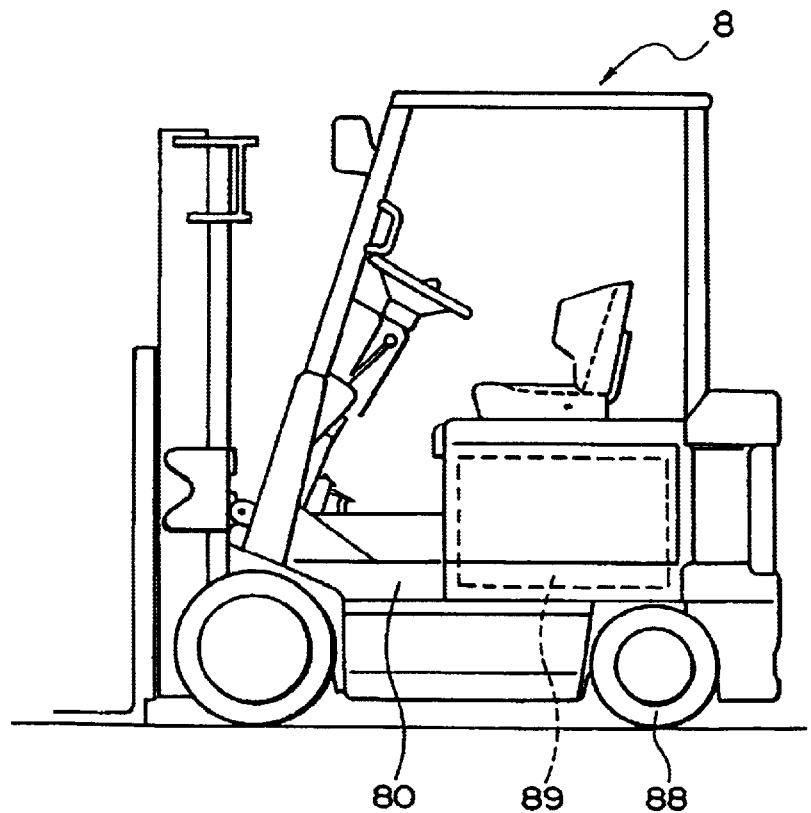
FIG. 2 is a side elevational view of an industrial vehicle according to the first embodiment of the present invention.

As shown in FIGS. 1 and 2, the swing suppressing device 1 according to the embodiment is a device for suppressing the swing motion of an axle 81 supported swingably up and down relative to a vehicle body 80 of an industrial vehicle 8.

As shown in FIG. 1, the swing suppressing device 1 comprises a damper 10 that may switch over between an expansion/retraction enable condition and an expansion/retraction disable condition and a link mechanism 2 for coupling the damper 10 and the axle 81 with each other.

The damper 10 is arranged with its expansion/retraction direction being directed to the substantially horizontal direction between the vehicle body 80 and the axle 81 and with its one end 11 being connected to the vehicle body 80 and with the other end 12 being connected to the axle 81 through the link mechanism 2.

The link mechanism 2 is adapted to convert the swing motion in the up-and-down direction of the axle 81 to a motion in the substantially horizontal direction to transmit it to the damper 10.

This will now be described in more detail.

As shown in FIG. 2, the industrial vehicle 8 according to this embodiment is a battery drive type forklift. As shown in FIGS. 2 and 3, in this industrial vehicle 8, a battery 89 that is a drive power source is arranged above the rear axle as the axle 81 of the rear wheels 88.

Figure 3:
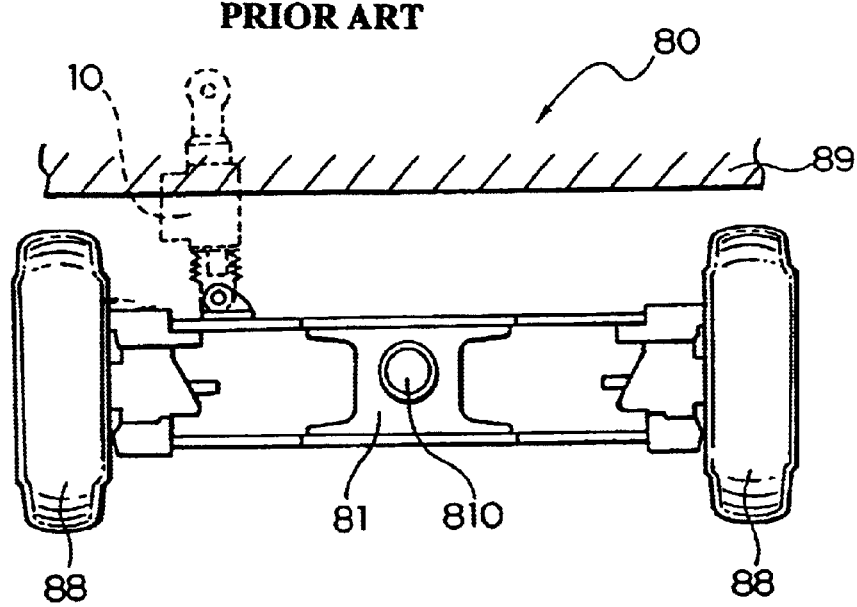
FIG. 3 is a supposed view for explaining a problem contained in the conventional case.

As shown in FIGS. 1 and 3, the rear axle that is the axle 81 has a swing center 810 in its central portion, and is coupled with the vehicle body 80 so that the right and left end portions thereof may be swung up and down about the swing center 810. Then, thus, the rear wheels 88 disposed at right and left ends of the axle 81 are adapted to be swingable up and down.

By the way, as shown in FIG. 3, in the industrial vehicle 8 according to this embodiment, as described above, the battery 89 is disposed above the axle 81 and the space above the axle 81 is very small. For this reason, as shown in FIG. 3, it is impossible to adopt the conventional method for arranging the damper 10 in the vertical position against the axle for suppressing the swing.

Accordingly, in the embodiment, as shown in FIG. 1, the damper 10 is arranged with its expansion and retraction direction being directed to the substantially horizontal direction between the body 80 and the axle 81. The end 11 of a cylinder of the damper 10 is coupled with a frame 801 of the vehicle body 80 and the tip end 12 of a rod 112 of the damper 10 is coupled to the axle 81 through the link mechanism 2.

The damper 10 (also referred to as a lock cylinder) is composed of a double-acting type hydraulic cylinder as shown in FIG. 1. This damper 10 is connected to a hydraulic circuit to be controlled by a control device (not shown) and is adapted to switch over between the expansion/retraction enable condition and the expansion/retraction disable condition as desired. Here, the expansion/retraction enable condition means a free condition that the working oil within the damper 10 maybe kept free for charge/discharge to thereby impart no restriction to the expansion/retraction motion of the rod 112. Also, the expansion/retraction disable condition means a condition that the rod 112 is held to be locked in a predetermined position by stopping the charge/discharge of the working oil within the damper 10.

As shown in FIG. 1, the link mechanism 2 comprises a first link member 21 having a substantially triangular shape with first, second and third link points 211, 212 and 213 at its respective apexes and a second link member 22 in the form of a rod having two link points 221 and 222.

The first link point 211 of the first link member 21 is connected to the other end 12 of the damper 10, the second link point 212 is connected to the frame 802 of the vehicle body 80 and the third link point 213 is connected to the link point 221 of the second link member 22.

Also, the link point 222 of the second link member 22 is connected to a swing transmission portion 815 of the axle 81.

Here it should be noted that, as shown in FIG. 1, a line connecting the first link point 211 and the second link point 212 of the first link member 21 with each other is disposed in the substantially vertical direction. Thus, in the case where the first link member 21 is slightly rotated about the second link point 212, the first link point 211 is shifted in the substantially horizontal direction.

The thus arranged link mechanism 2 is interposed between the damper 10 and the axle 81 so that the swing motion of the axle 81 may be suitably restricted by the damper 10.

Namely, as shown in FIG. 1, the swing motion in the vertical direction of the axle 81 is transmitted from the swing transmission point 815 of the axle 81 to the first link member 21 through the second link member 22. This transmission causes the swing motion of the axle 81 to be converted into the rotational motion about the second link point 212 in the first link member 21. Then, as described above, the rotational motion of the first link member 21 is transmitted to the damper 10 as the shift in the substantially horizontal direction at the first link point 211.

Then, in the case where the damper 10 is in the expansion/retraction disable condition, the rotation of the first link member 21 is restricted by the damper 10 so that the swing motion of the axle 81 is restricted through the second link member 22. On the other hand, in the case where the damper 10 is in the expansion/retraction enable condition, the rotation of the second link member 22 is not restricted but the free condition of the swing motion of the axle 81 is kept free.

Thus, in this embodiment, the damper 10 is arranged in the substantially horizontal direction through the link mechanism 2. For this reason, even if the space above the swingable axle 81 is small, as described above, it is possible to arrange the damper 10 in the horizontal direction and at the same time to exhibit the same swing motion restricting ability as in the conventional case.

Incidentally, the damper 10 may be controlled by using controllable factors such as a value of the lateral acceleration (lateral G) and the idle rotational condition of the front wheels as in the conventional case. More specifically, the control device for controlling the hydraulic circuit connected to the damper 10 uses the lateral G of the vehicle body and the idle rotational condition of the front wheels, as the control factors. In this case, the precision of the swing control of the axle 81 should be enhanced.

Embodiment 2

Figure 4:
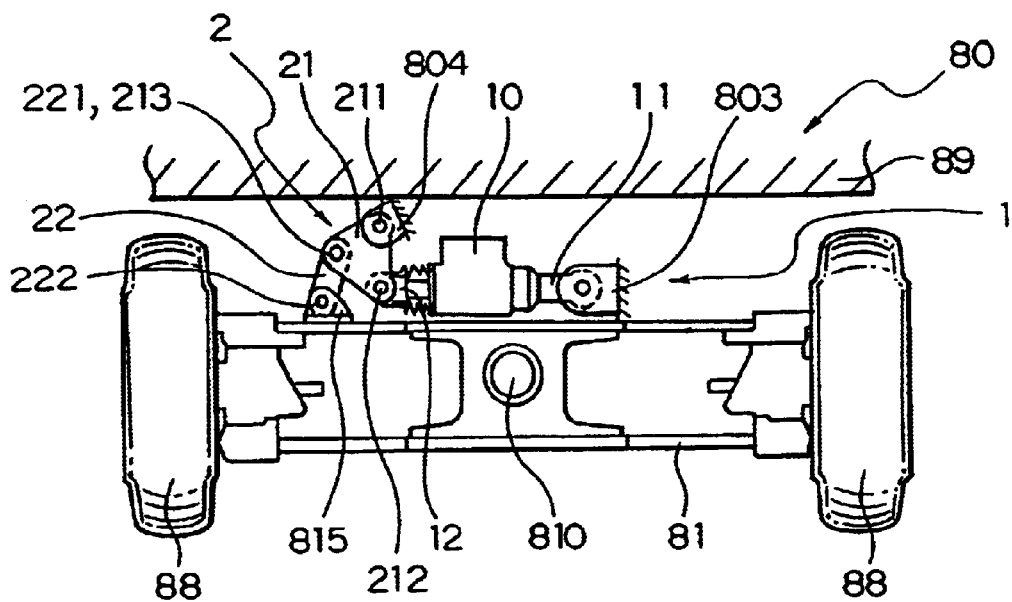
FIG. 4 is a view showing the structure of a swing suppressing device in accordance with a second embodiment of the present invention.

As shown in FIG. 4, this embodiment is an example in which the coupling relationship between the link mechanism 2 and the damper 10 according to the first embodiment is modified. Namely, in the first link member 21, the first link point 211, the second link point 212 and the third link point 213 are connected to the frame 804, the other end 12 of the damper 10 and the link point 221 of the second link member 22, respectively.

Also, in the second link member 22, the link point 222 is connected to the swing transmission point 815 of the axle 81. The end 11 of the damper 10 is connected to the frame 803 of the vehicle body 80. The other arrangement is the same as that of the first embodiment. In this case, the same action and effect as embodiment 1 is obtained.

As described above, according to the present invention, even if the space above the axle that may swing is small, it is possible to provide a swing motion suppressing device that may readily be incorporated in the vehicle body.

What is claimed is:

1. A swing suppressing device for suppressing a swing motion of an axle that is mounted swingably up and down on a vehicle body of an industrial vehicle powered by a battery that is disposed above the axle, said swing suppressing device comprising:

an axle that supports both rear wheels;

one damper disposed below the battery, between the axle and the vehicle body, said damper having an expansion/retraction direction that is substantially horizontal, said damper pivotally attached to the vehicle body at a first end, said damper can be switched over between an expansion/retraction enable condition and an expansion/retraction disable condition; and a link mechanism pivotally coupled with a second end of said damper and with the axle, said link mechanism thereby converting a swing motion of the axle to a substantially horizontal motion transmitted to said damper.

2. A swing suppressing device according to claim 1, wherein said link mechanism comprises:

a first link member in which first, second and third link points are located at apexes of a triangular shape, respectively; and a second link member having two link points, said first link point, said second link point and said third link point of said first link member being connected to the other end of said damper, said vehicle body and one of the link points of said second link member, respectively, the other link point of said second member being connected to said axle.

3. A swing suppressing device according to claim 1, wherein said damper is composed of a double acting type hydraulic cylinder.

4. A swing suppressing device according to claim 2, wherein said first link point and said second link point of said first link member are disposed on a common substantially vertical line.

* * * * *